United States Patent
Deng

(10) Patent No.: US 8,624,418 B2
(45) Date of Patent: Jan. 7, 2014

(54) DEVICE FOR CONVERTING WAVE ENERGY INTO ELECTRICITY

(71) Applicant: Zhongshan Fantasy Model Design Co., Ltd., Zhongshan (CN)

(72) Inventor: Zhihui Deng, Zhongshan (CN)

(73) Assignee: Zhongshan Fantasy Model Design Co., Ltd., Zhongshan (CN)

( * ) Notice: Subject to any disclaimer, the term of this patent is extended or adjusted under 35 U.S.C. 154(b) by 0 days.

(21) Appl. No.: 13/802,680

(22) Filed: Mar. 13, 2013

(65) Prior Publication Data

US 2013/0200627 A1 Aug. 8, 2013

Related U.S. Application Data

(63) Continuation-in-part of application No. PCT/CN2011/001397, filed on Aug. 22, 2011.

(30) Foreign Application Priority Data

Sep. 29, 2010 (CN) .......................... 2010 1 0502249

(51) Int. Cl.
*F03B 13/12* (2006.01)
(52) U.S. Cl.
USPC ............................................. 290/53; 290/54
(58) Field of Classification Search
USPC ........................................ 290/42, 43, 53, 54
See application file for complete search history.

(56) References Cited

U.S. PATENT DOCUMENTS

| | | | | |
|---|---|---|---|---|
| 4,322,200 A * | 3/1982 | Stiegelmeier | ................. | 416/184 |
| 4,447,740 A * | 5/1984 | Heck | ................ | 290/53 |
| 4,686,376 A * | 8/1987 | Retz | ................ | 290/42 |
| 4,850,190 A * | 7/1989 | Pitts | ................ | 60/398 |
| 6,768,216 B1 * | 7/2004 | Carroll et al. | ................ | 290/42 |
| 6,933,623 B2 * | 8/2005 | Carroll et al. | ................ | 290/42 |
| 8,207,622 B2 * | 6/2012 | Koola et al. | ................ | 290/42 |
| 8,269,364 B2 * | 9/2012 | Lai | ................ | 290/53 |
| 8,450,869 B2 * | 5/2013 | Deng | ................ | 290/53 |
| 8,456,031 B1 * | 6/2013 | Hull et al. | ................ | 290/54 |
| 8,497,593 B2 * | 7/2013 | Klukowski | ................ | 290/53 |
| 2010/0283248 A1 * | 11/2010 | Moffat | ................ | 290/52 |

* cited by examiner

*Primary Examiner* — Tho D Ta
*Assistant Examiner* — Viet Nguyen
(74) *Attorney, Agent, or Firm* — Matthias Scholl P.C.; Matthias Scholl

(57) ABSTRACT

A device for converting wave energy into electricity, the device including: a float; a guiding-accelerating wheel, the guiding-accelerating wheel including a wheel body including a casing, a wheel center, and a chamber; an impeller; and an electric generator, the electric generator including a rotor. The float is upward and downward movable in accord with a movement of wave. The guiding-accelerating wheel is connected to a lower part of the float. The wheel center is disposed inside the casing. A plurality of deflectors is annularly arranged between the casing and the wheel body, and the deflectors are inclined to a same direction. Water channels are formed by the casing, the wheel center, and every two adjacent deflectors, each water channel including a water outlet. The impeller is clamped on the guiding-accelerating wheel at a position corresponding to the water outlet of the water channel.

10 Claims, 13 Drawing Sheets

DEVICE FOR CONVERTING WAVE ENERGY INTO ELECTRICITY

CROSS-REFERENCE TO RELATED APPLICATIONS

This application is a continuation-in-part of International Patent Application No. PCT/CN2011/001397 with an international filing date of Aug. 22, 2011, designating the United States, now pending, and further claims priority benefits to Chinese Patent Application No. 201010502249.4 filed Sep. 29, 2010. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to a device for converting wave energy in a hydrostatic layer into electricity.

2. Description of the Related Art

Electricity generated by wave power is advantages in pollution free and no fuel consumption, so that how to utilize the wave power becomes a worldwide focus for ocean engineering researchers.

Wave power generation is using an electricity generation device in a hydrostatic layer of the ocean to transform the wave energy into the electrical energy. To effectively capture the wave energy, the operation of the electricity generation device in the hydrostatic layer is designed according to the up and down vibration of the wave; the movement of the electricity generation device is stabilized to capture the kinetic energy which is then utilized to generate electricity. In a word, the up and down vibration of the wave is transformed into the rotation of are volution axis.

Because of the instability of the wave, two types of the electricity generation devices are generally used. One type of the electricity generation device is placed on the sea floor; this type of the device has a complicated structure, is easy to damage by the corrosion of the sea water and the invasion of the wave, thereby shortening the service life, increasing the cost in construction and maintenance. The other type of the electricity generation device floats on the water surface, and adopts an impeller to drive the motor rotor to rotate alternatively forward and backward; however, a large amount of energy is consumed in reversing the rotation direction of the motor rotor.

Thus, it is desired to study the technology of wave power generation and simplify the structure of the electric generator.

SUMMARY OF THE INVENTION

In view of the above-described problems, it is one objective of the invention to provide a device for converting wave energy in a hydrostatic layer into electricity. The invention has a simple structure, is capable of accelerating and pressurizing the water flow, and decreasing the energy consumption in transmission.

To achieve the above objective, in accordance with one embodiment of the invention, there is provided a device for converting wave energy in a hydrostatic layer into electricity, the device comprising: a float; a guiding-accelerating wheel, the guiding-accelerating wheel comprising a wheel body comprising a casing, a wheel center, and a chamber; an impeller; and an electric generator, the electric generator comprising a rotor. The float is upward and downward movable in accord with a movement of wave. The guiding-accelerating wheel is connected to a lower part of the float. The wheel center is disposed inside the casing; a plurality of deflectors is annularly arranged between the casing and the wheel body, and the deflectors are inclined to a same direction. Water channels are formed by the casing, the wheel center, and every two adjacent deflectors, each water channel comprising a water outlet. The impeller is clamped on the guiding-accelerating wheel at a position corresponding to the water outlet of the water channel, and the impeller is movable in relation to the guiding-accelerating wheel. A plurality of blades is annularly arranged on the impeller. The blades cooperate with the water outlet to allow the water from the water outlet to collide with the blades and drive the impeller to rotate. The electric generator is arranged inside the chamber; and the rotor is driven by the impeller.

In a class of this embodiment, the chamber is arranged inside the wheel center close to the impeller. The electric generator further comprises a stator. The impeller further comprises an impeller shaft. The stators in rigid connection with the wheel center; and the rotor is connected to and driven by the impeller shaft.

In a class of this embodiment, at least one of the wheel center and the casing is in a shape of a cone for forming a tapered cross section of the water channel and a relatively small water outlet.

In a class of this embodiment, the casing is in a shape of a cylinder. The wheel center is in a shape of a cone. The deflectors are disposed on a lower part of the casing. A top of the casing and the wheel center form a water inlet cavity.

In a class of this embodiment, the blades are a curved blade comprising a concave side. The concave side of the blades faces the water outlet for allowing the water from the water outlet to collide with the concave side of the blades.

In a class of this embodiment, a downward pressurizing cylinder is connected to the lower part of the float. The downward pressurizing cylinder comprises a water storage cavity comprising a top and a bottom. The top of the water storage cavity is open. A water leaking hole is arranged on the bottom of the water cavity.

In a class of this embodiment, a plurality of vertical anti-rotating boards is disposed on an outer side of the casing. A vertical height of the vertical anti-rotating board is much larger than a thickness thereof. A plurality of anti-rotating ear-shaped plates is disposed on an outer side of the downward pressurizing cylinder. The vertical anti-rotating boards are in rigid connection with the anti-rotating ear-shaped plates, respectively.

In accordance with another embodiment of the invention, there is provided a device for converting wave energy in a hydrostatic layer into electricity comprising: a float; a guiding-accelerating wheel, the guiding-accelerating wheel comprising a wheel body comprising a casing, a wheel center, and a chamber; an impeller; and an air compressor, the air compressor comprising an air inlet and an air outlet. The float is upward and downward movable in accord with a movement of wave. The guiding-accelerating wheel is connected to a lower part of the float. The wheel center is disposed inside the casing; a plurality of deflectors is annularly arranged between the casing and the wheel body, and the deflectors are inclined to a same direction. Water channels are formed by the casing, the wheel center, and every two adjacent deflectors, each water channel comprising a water outlet. The impeller is clamped on the guiding-accelerating wheel at a position corresponding to the water outlet of the water channel, and the impeller is movable in relation to the guiding-accelerating wheel. A plurality of blades is annularly arranged on the impeller. The blades cooperate with the water outlet to allow the water from the water outlet to collide with the blades and drive the impeller to rotate. The air compressor is arranged inside the chamber and is driven by the impeller. The air inlet and the air outlet of the air compressor are connected to an air inlet pipe and an air outlet pipe, respectively. The air inlet pipe and the air outlet pipe are extended out of a water surface. The air outlet pipe is connected to an air motor; and the air motor drives an electric generator to generate electricity.

In a class of this embodiment, the air compressor is a rotary screw air compressor comprising a compressor casing, a main rotor, and an auxiliary rotor; and the main rotor and the auxiliary rotor are engaged with each other.

In a class of this embodiment, a number of the guiding-accelerating wheel is two; the two guiding-accelerating wheels are arranged on a lower side and an upper side of the impeller, respectively; and the air compressor is arranged inside each of the guiding-accelerating wheels.

The invention further provides a device for converting wave energy in a hydrostatic layer into electricity comprises: a float; a guiding-accelerating wheel, the guiding-accelerating wheel comprising a wheel body comprising a casing, a wheel center, and a chamber; an impeller; and a hydraulic pump, the hydraulic pump comprising an oil inlet and an oil outlet. The float is upward and downward movable in accord with a movement of wave. The guiding-accelerating wheel is connected to a lower part of the float. The wheel center is disposed inside the casing; a plurality of deflectors is annularly arranged between the casing and the wheel body, and the deflectors are inclined to a same direction. Water channels are formed by the casing, the wheel center, and every two adjacent deflectors, each water channel comprising a water outlet. The impeller is clamped on the guiding-accelerating wheel at a position corresponding to the water outlet of the water channel, and the impeller is movable in relation to the guiding-accelerating wheel. A plurality of blades is annularly arranged on the impeller. The blades cooperate with the water outlet to allow the water from the water outlet to collide with the blades and drive the impeller to rotate. The hydraulic pump is arranged inside the chamber and is driven by the impeller. The oil inlet and the oil outlet of the hydraulic pump are connected to an oil inlet pipe and an oil outlet pipe, respectively. The oil inlet pipe and the oil outlet pipe are extended out of a water surface. The oil inlet pipe and the oil outlet pipe are connected to a hydraulic motor. The hydraulic motor drives an electric generator to generate electricity.

Advantages of the invention are summarized as follows:

1. The electric generator is arranged inside the guiding-accelerating wheel, which lowers the energy consumption in the transmission mechanism and the transmission process; the adopted curved conical wheel center and the laminar deflectors have a better effect in the acceleration and pressurization of the water flow, and a high efficiency in collecting the wave energy. Besides, the curved blade of the impeller is capable of accumulating the kinetic energy of the water flow.

2. The device for generating electricity using wave energy employs the air compressor or the hydraulic pump to transform the wave energy into a pressure energy which is further transformed to the kinetic energy via the air motor or the hydraulic motor, and finally the kinetic energy is transformed into the electric energy. Thus, the electric elements of the electric generator are not necessitated to operate in the water, thereby prolonging the service life of the electric generator, lowering the cost in maintenance and sealing.

3. It is simple to accumulate the high-pressure air or oil from a plurality of air compressors or hydraulic pumps.

DETAILED DESCRIPTION OF THE EMBODIMENTS

Figure 1:
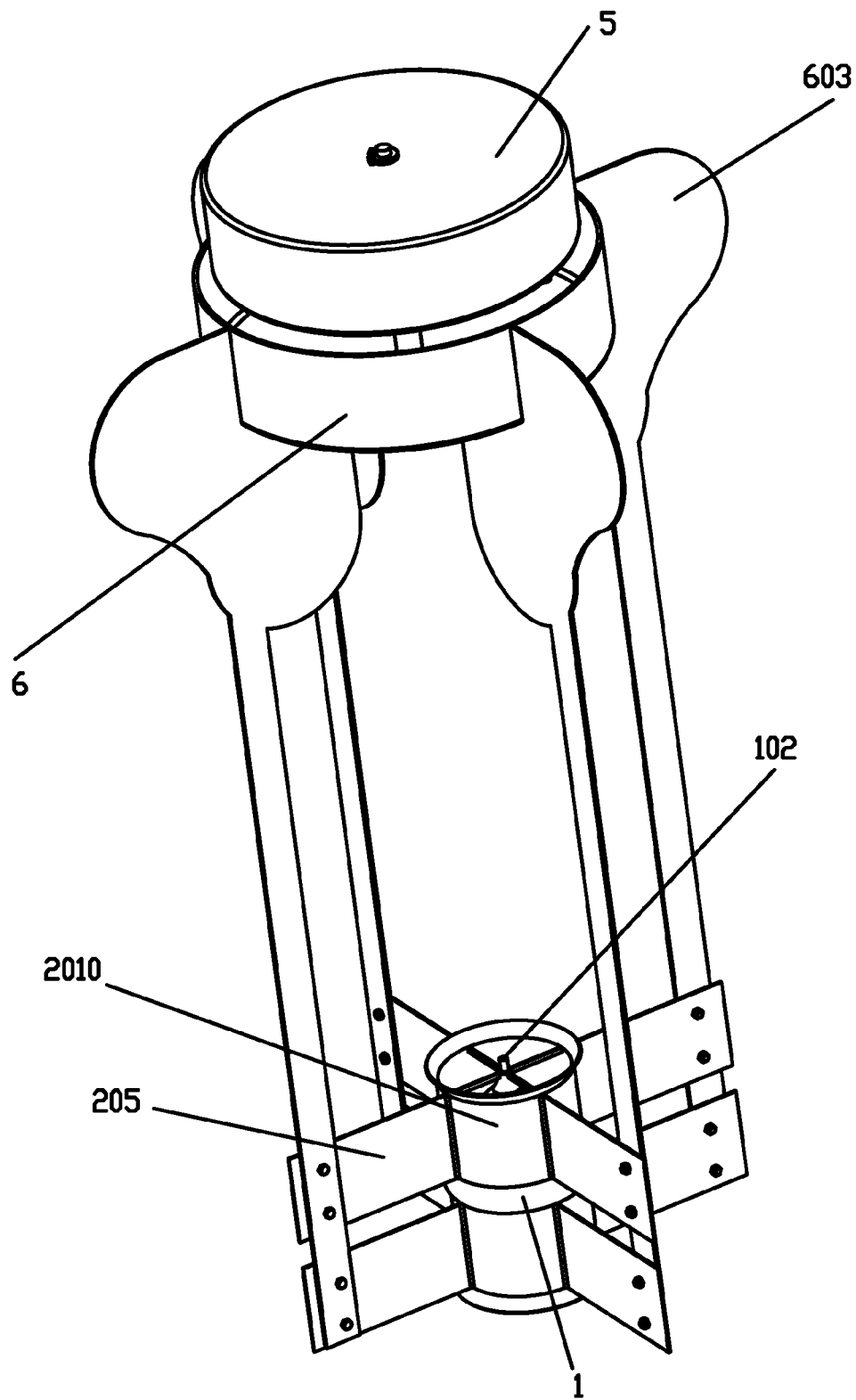
FIG. 1 is a stereogram of a device for generating electricity using wave energy of Example 1 of the invention.
Figure 2:
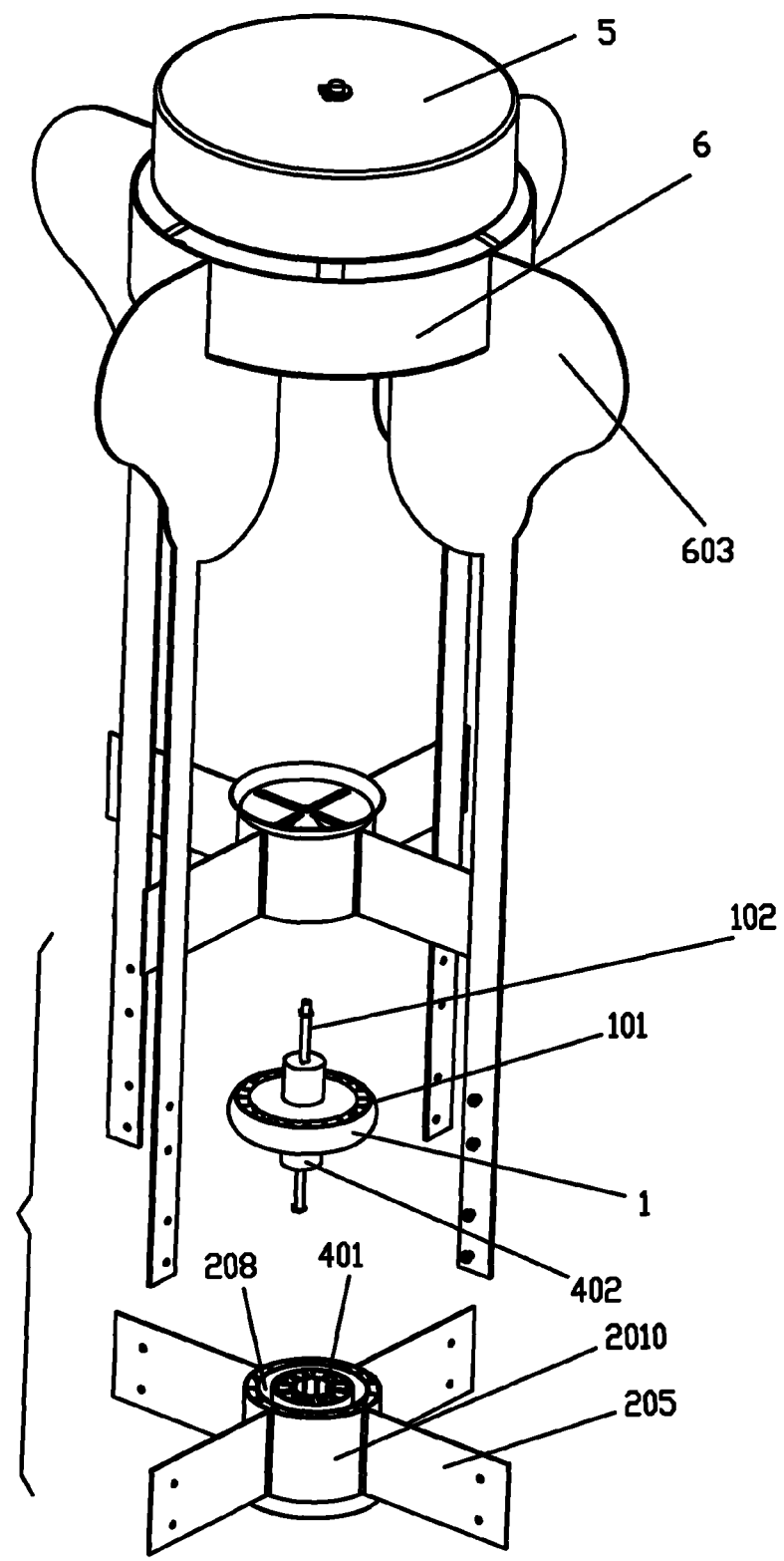
FIG. 2 is an exploded view of a device for generating electricity using wave energy of Example 1 of the invention.
Figure 3:
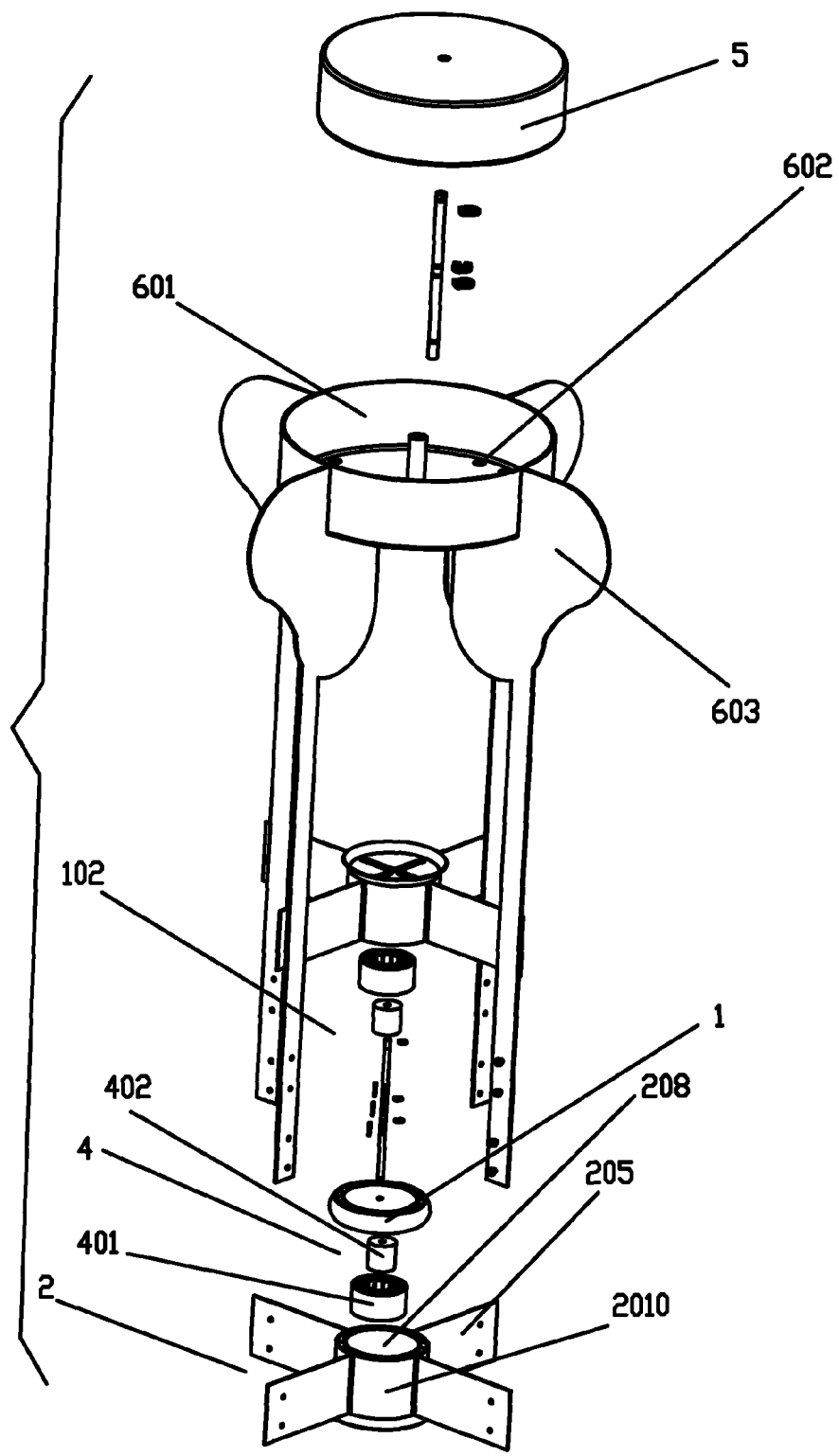
FIG. 3 is another exploded view of a device for generating electricity using wave energy of Example 1 of the invention.
Figure 4:
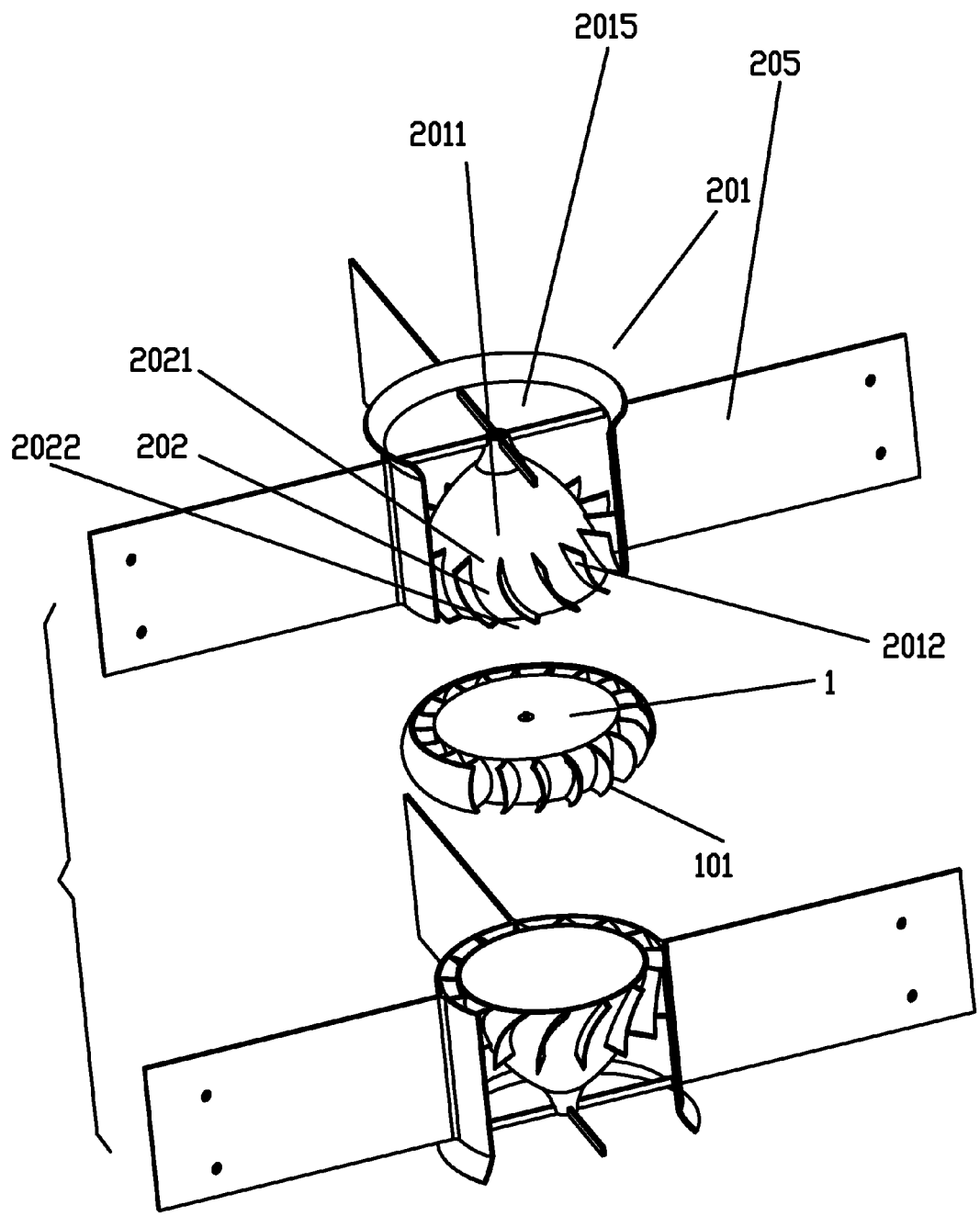
FIG. 4 is a cutaway view of a device for generating electricity using wave energy of Example 1 of the invention.
Figure 5:
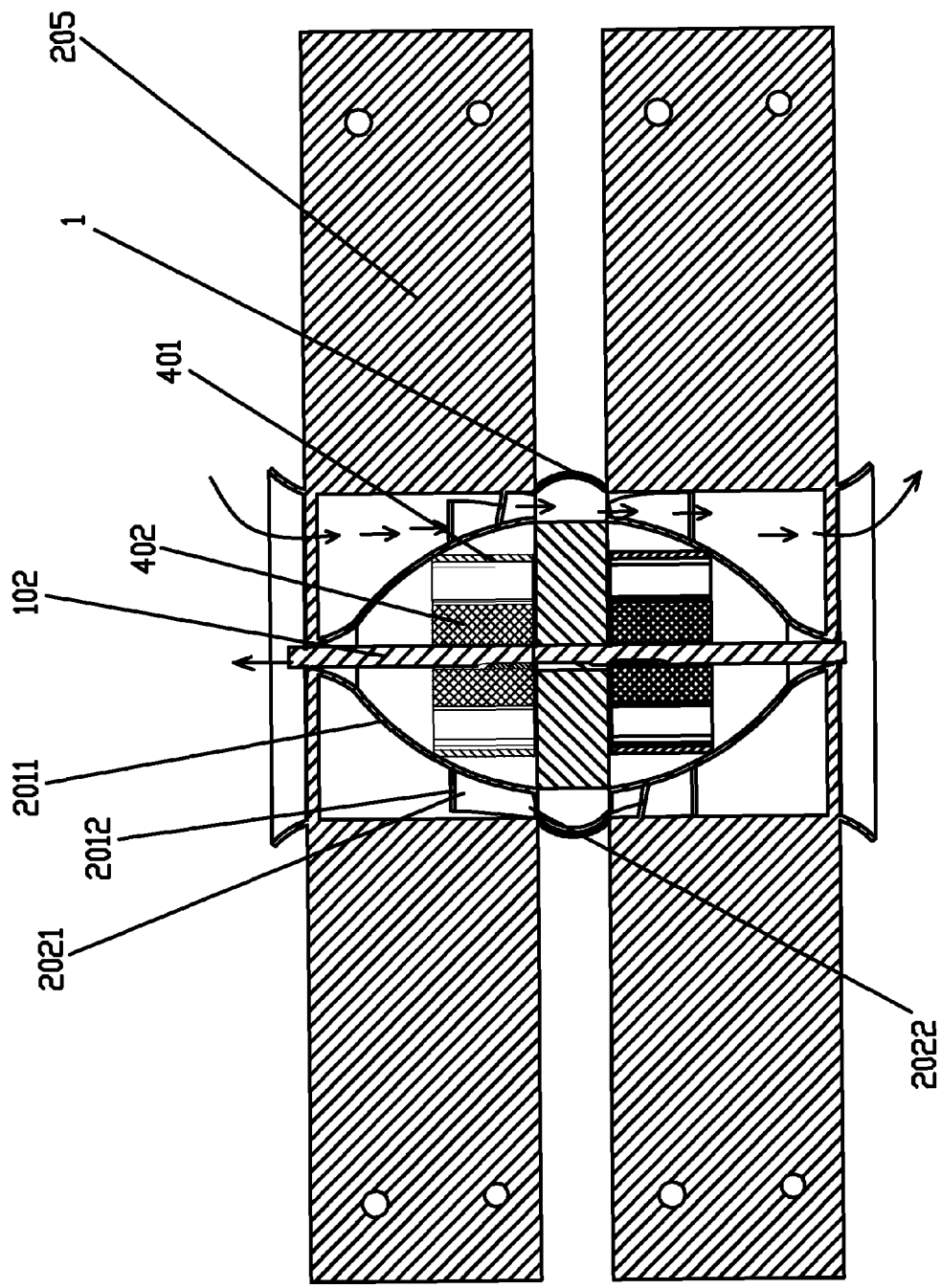
FIG. 5 is a diagram of a direction of water flow during an upward movement of a device for generating electricity of Example 1.
Figure 6:
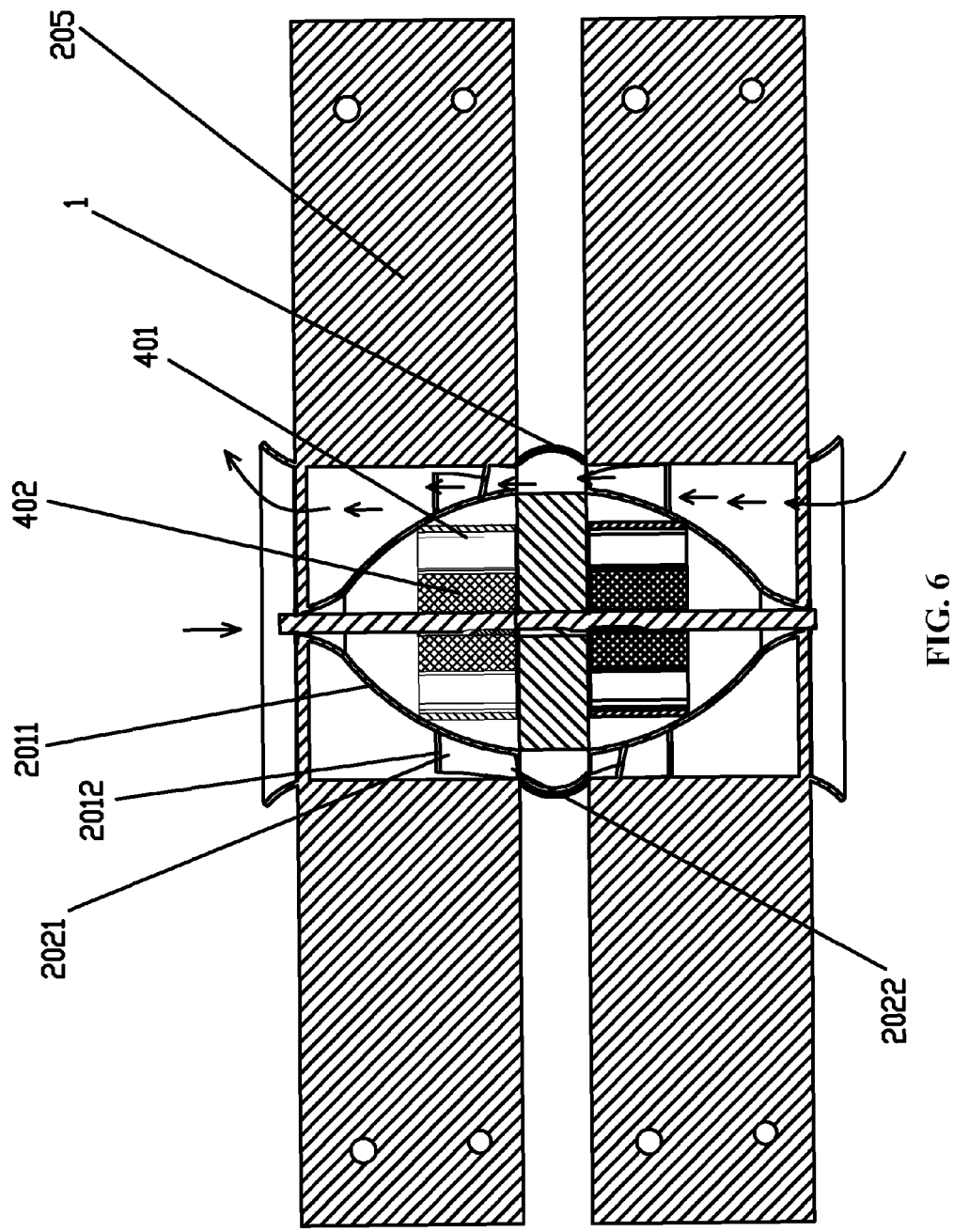
FIG. 6 is a diagram of a direction of water flow during a downward movement of a device for generating electricity of Example 1.
Figure 7:
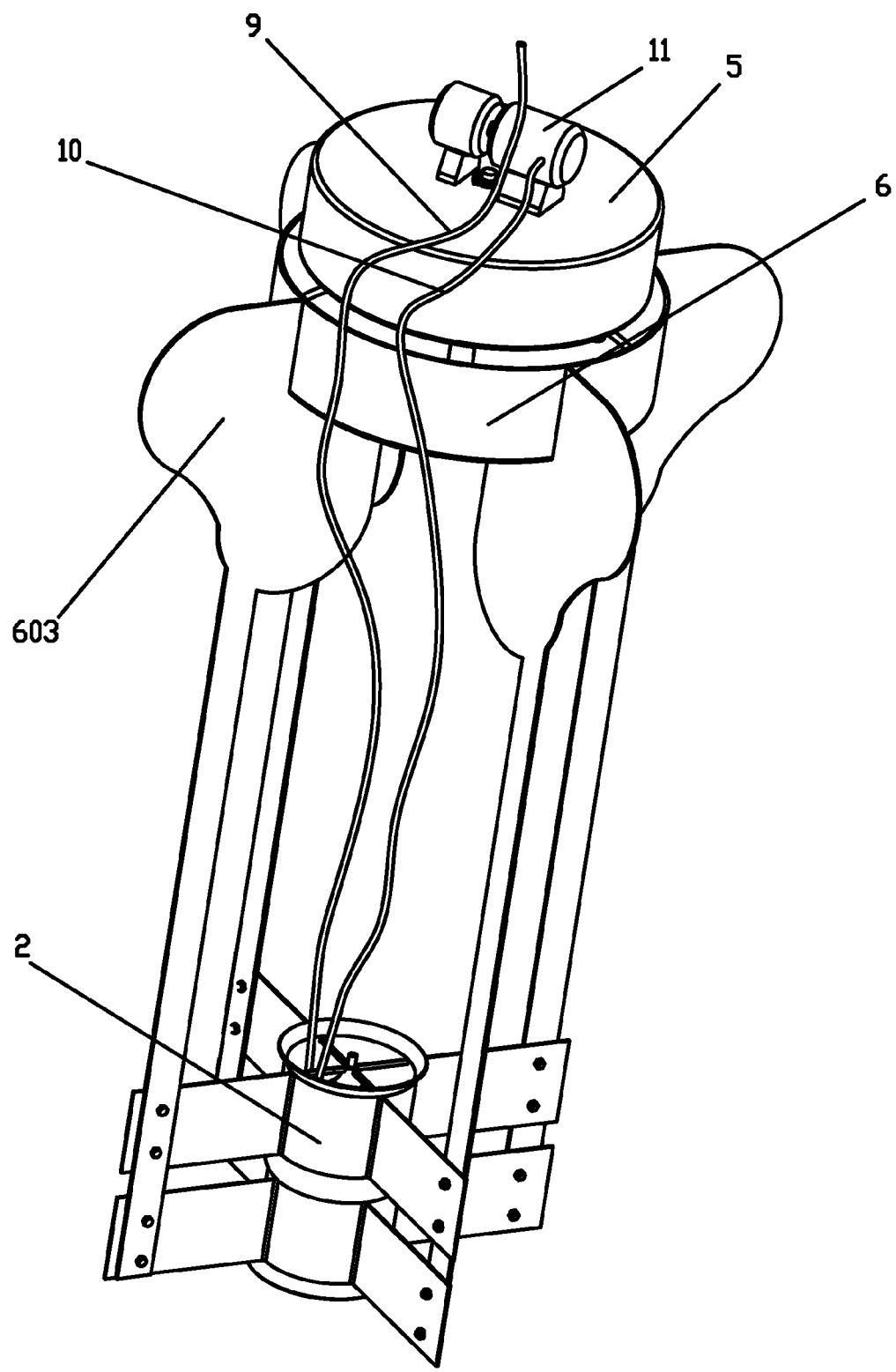
FIG. 7 is a stereogram of a device for generating electricity using wave energy of Example 2 of the invention.
Figure 8:
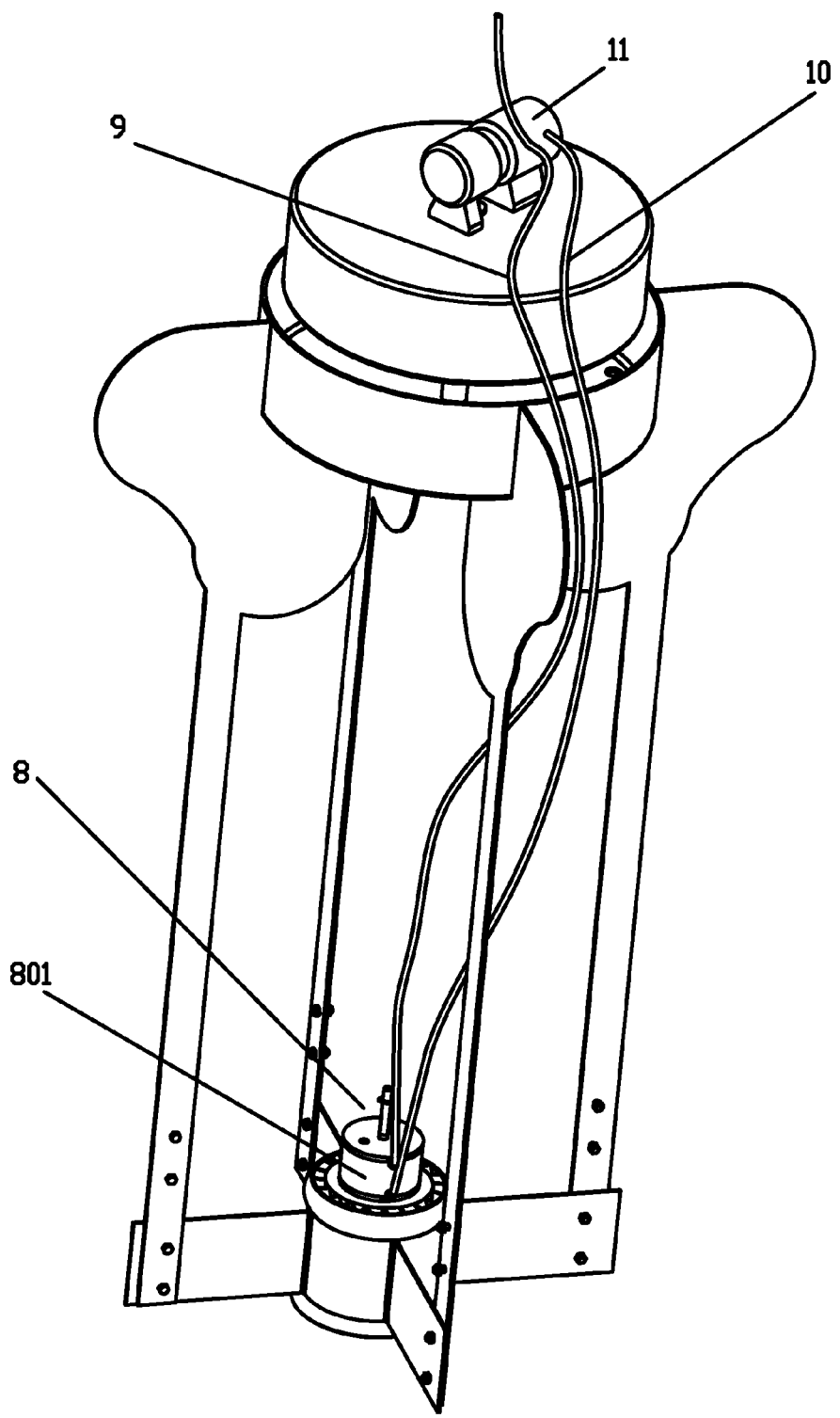
FIG. 8 is another stereogram of a device for generating electricity using wave energy of Example 2 of the invention.
Figure 9:
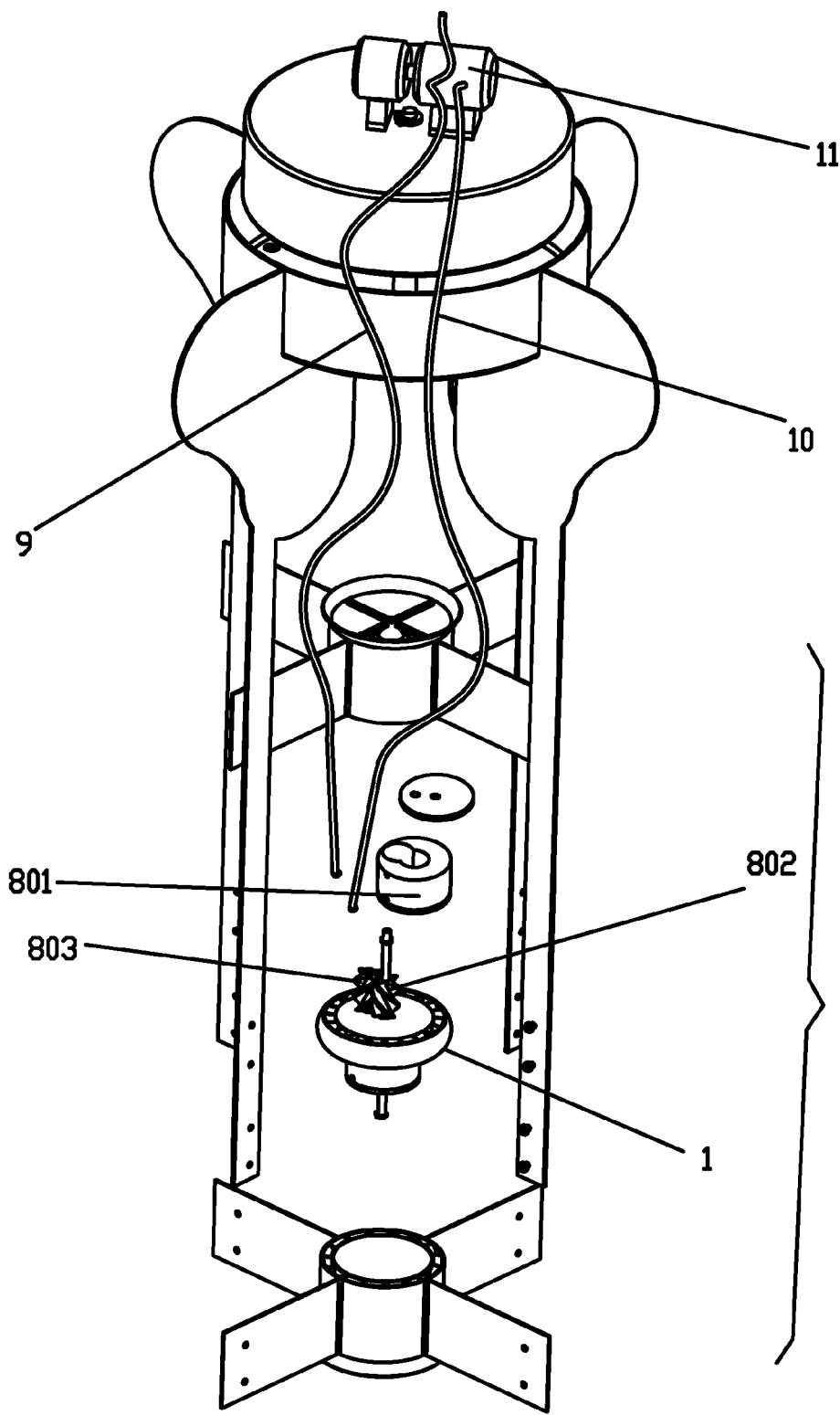
FIG. 9 is an exploded view of a device for generating electricity using wave energy of Example 2 of the invention.
Figure 10:
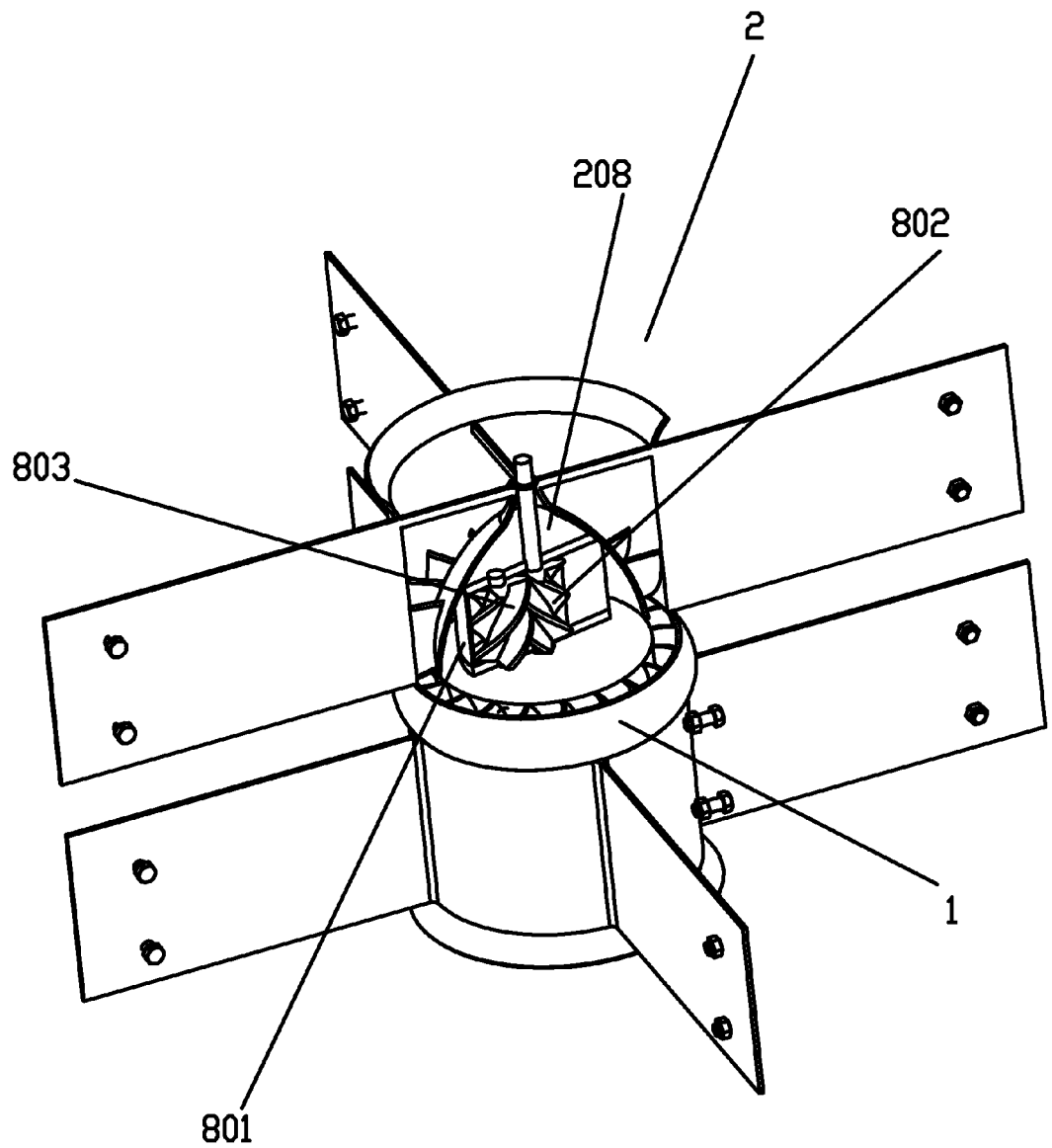
FIG. 10 is a cutaway view of a device for generating electricity using wave energy of Example 2 of the invention.
Figure 11:
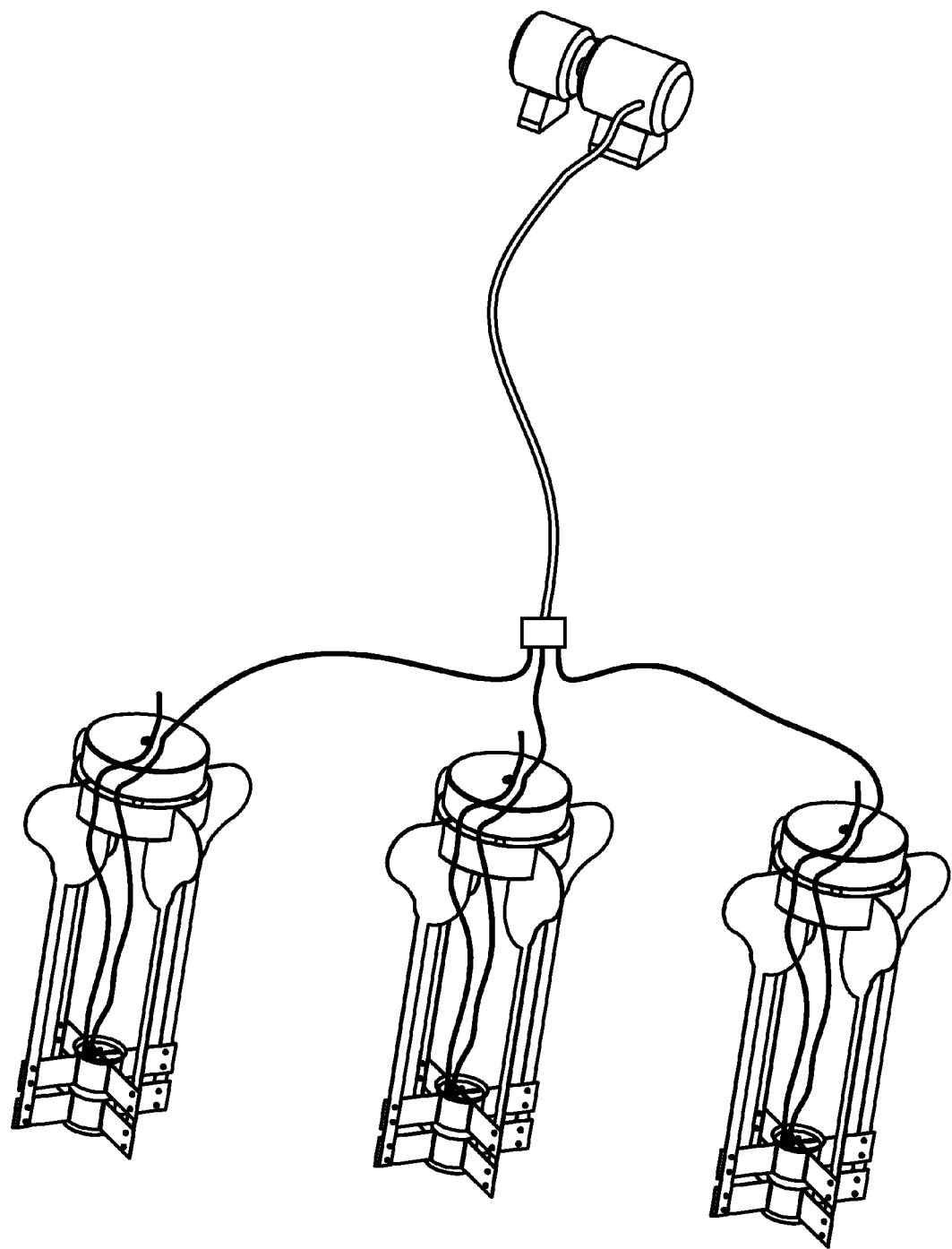
FIG. 11 is an operation state diagram of a plurality of devices for accumulating high-pressure air of Example 2 of the invention.

For further illustrating the invention, experiments detailing a device for generating electricity using wave energy are described below. It should be noted that the following examples are intended to describe and not to limit the invention.

Example 1

As shown in FIGS. 1-6, a device for converting wave energy in a hydrostatic layer into electricity comprises: a float 5; a guiding-accelerating wheel 2, the guiding-accelerating wheel 2 comprising a wheel body 201 comprising a casing 2010, a wheel center 2011, and a chamber 208; an impeller 1; and an electric generator 4, the electric generator 4 comprising a rotor 402. The float 5 is upward and downward movable in accord with a movement of wave. The guiding-accelerating wheel 2 is connected to a lower part of the float 5. The wheel center 2011 is disposed inside the casing 2010; a plurality of deflectors 2012 is annularly arranged between the casing 2010 and the wheel body 201, and the deflectors 2012 are inclined to a same direction. Water channels 202 are formed by the casing 2010, the wheel center 2011, and every two adjacent deflectors 2012. Each water channel comprises a water outlet 2022. The impeller 1 is clamped on the guiding-accelerating wheel 2 at a position corresponding to the water outlet 2022 of the water channel 202, and the impeller 1 is movable in relation to the guiding-accelerating wheel 2. A plurality of blades 101 is annularly arranged on the impeller 1. The blades 101 cooperate with the water outlet 2022 to allow the water from the water outlet 2022 to collide with the blades 101 and drive the impeller 1 to rotate. The electric generator 4 is arranged inside the chamber 208; and the rotor 402 is driven by the impeller 1.

The chamber 208 is arranged inside the wheel center 2011 close to the impeller 1. The electric generator further comprises a stator 401. The impeller 1 further comprises an impeller shaft 102. The stator 401 is in rigid connection with the wheel center 2011; and the rotor 402 is connected to and driven by the impeller shaft 102.

The electric generator 4 can be optionally arranged in the guiding-accelerating wheel 2 at an upper or lower side of the impeller 1, or both. The rotor 402 can be fixed and sleeved on an outer side of the impeller 1 as needed, and the chamber 28 extends to the outer side of the impeller 1. The stator 401 is fixed in the chamber 28 and is sleeved on the rotor.

At least one of the wheel center 2011 and the casing 2010 is in a shape of a cone for forming a tapered cross section of the water channel 202 and a relatively small water outlet 2022.

The casing 2010 is in a shape of a cylinder. The wheel center 2011 is in a shape of a cone.

The deflectors 2012 are disposed on a lower part of the casing 2010. A top of the casing 2010 and the wheel center 2011 form a water inlet cavity 2015.

The blades 101 are a curved blade comprising a concave side. The concave side of the blades 101 faces the water outlet 2022 for allowing the water from the water outlet 2022 to collide with the concave side of the blades 101.

A downward pressurizing cylinder 6 is connected to the lower part of the float 5. The downward pressurizing cylinder 6 comprises a water storage cavity 601 comprising a top and a bottom. The top of the water storage cavity 601 is open. A water leaking hole 602 is arranged on the bottom of the water cavity 602.

A plurality of vertical anti-rotating boards 205 is disposed on an outer side of the casing 2010. A vertical height of the vertical anti-rotating board 205 is much larger than a thickness thereof. A plurality of anti-rotating ear-shaped plates 603 is disposed on an outer side of the downward pressurizing cylinder 6. The vertical anti-rotating boards 205 are in rigid connection with the anti-rotating ear-shaped plates 603, respectively.

The float 5 comprises a sealed cavity inside.

The deflectors 2012 are spirally inclined.

Water outlets 2022 of the two guiding-accelerating wheels 2 arranged on two sides of the impeller 1 are all face the concave sides of the blades arranged on the impeller 1 for allowing the water from the water outlet 2022 to collide with the blades and drive the impeller 1 to rotate to a same direction. When the electricity generation device moves upward, the water flows through an upper part of the guiding-accelerating wheel 2 disposed on the upper side of the impeller 1 into the water channel 202; then, the water flows out of the water outlet 2022 arranged on the upper side of the impeller 1, collides with the blades 101, and drives the impeller 1 to rotate. When the electricity generation device moves downward, the water flows through lower part of the guiding-accelerating wheel 2 disposed on the lower side of the impeller 1 into the water channel 202; then, the water flows out of the water outlet 2022 arranged on the lower side of the impeller 1, collides with the blades 101, and drives the impeller 1 to rotate. The spiral direction of the water channels disposed on the upper side of the impeller 1 is opposite to the spiral direction of the water channels disposed on the lower side of the impeller 1 for assuring the impeller rotates to the same direction.

When the electricity generation device moves upward along with the wave, a buoyant force imposed on the float 5 overcomes the gravity thereof and a drag force from the lower elements, thus, the whole electricity generation device moves upward in accord with the movement of the wave. An upper water surface inside the water storage cavity 601 is open to the seawater outside the water storage cavity 601, thus no buoyant force is produced on the water storage cavity 601. When the electricity generation device moves downward along with the wave, the water does not leak from the water leaking hole 602 quickly; a drag force from the lower elements, such as the lower water inlet, makes the water flow out of the water surface of the water storage cavity 601. When the water gravity is equal to the drag force, the water gravity is imposed on the electricity generation device to enlarge a downward press on the device, thereby improving a rotational torque of the shaft.

Example 2

Example 2 is different from Example 1 in that, as shown in FIGS. 7-11, an air compressor 8 is arranged inside the chamber 208 and is driven by the impeller 1. An air inlet and an air outlet of the air compressor 8 are connected to an air inlet pipe 9 and an air outlet pipe 10, respectively. The air inlet pipe 9 and the air outlet pipe 10 are extended out of a water surface. The air outlet pipe 10 is connected to the air motor 11; and the air motor 11 drives the electric generator to generate electricity.

The air compressor 8 is a rotary screw air compressor comprising a compressor casing 801, a main rotor 802, and an auxiliary rotor 803. The main rotor 802 and the auxiliary rotor 803 are engaged with each other.

A number of the guiding-accelerating wheel 2 is two; the two guiding-accelerating wheels 2 are arranged on a lower side and an upper side of the impeller 1, respectively. The air compressor 8 is arranged inside each of the guiding-accelerating wheels 2. The pressurized air from the two air compressors is accumulated and transported to the air motor as a power source.

The air compressor 8 can also be a scroll air compressor, a piston air compressor, or other types of air compressors.

The electric generator is placed on the float; or the air outlet pipe is extended away from the device in the water, such as an offshore platform or the land, to actuate the air motor which further drives the electric generator to operate. Thus, the pressurized air from the different air outlet pipes can be accumulated to drive a large scale electric generator, or the accumulated pressurized air source drives different electric generators via a plurality of air pipes.

Example 3

Figure 12:
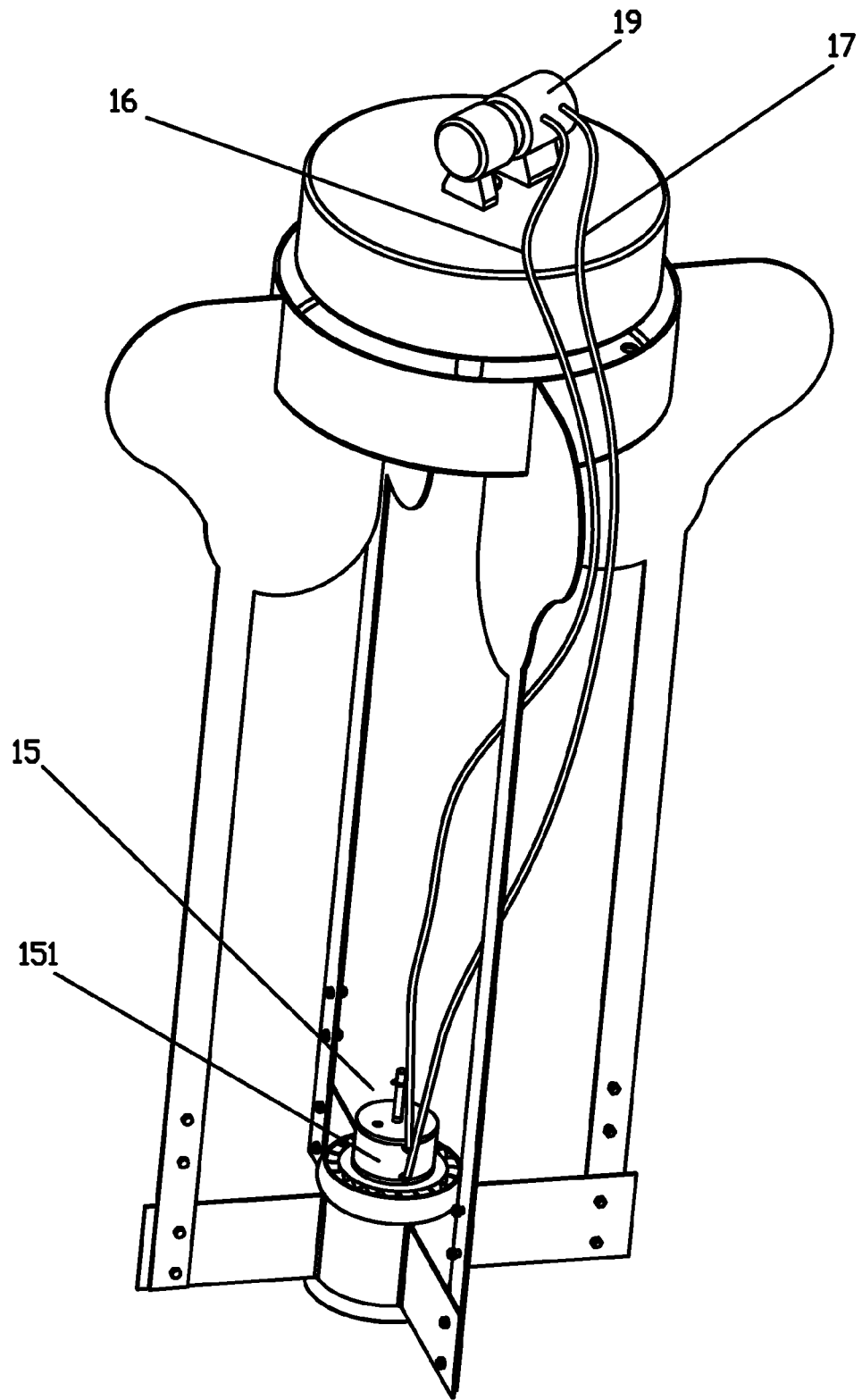
FIG. 12 is a stereogram of a device for generating electricity using wave energy of Example 3 of the invention.
Figure 13:
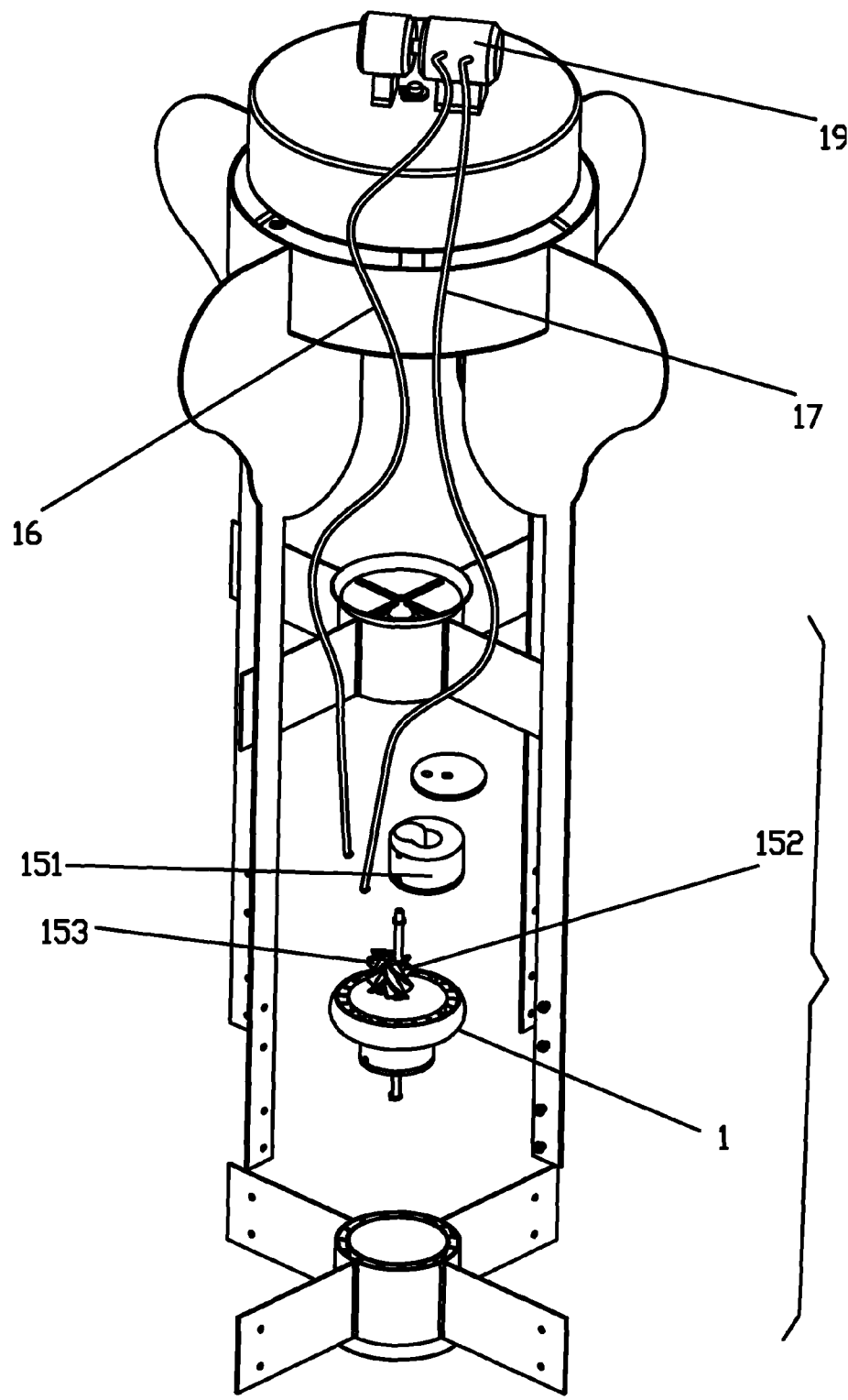
FIG. 13 is an exploded view of a device for generating electricity using wave energy of Example 3 of the invention.

Example 3 is different from Example 2 in that, as shown in FIGS. 12-13, a hydraulic pump 15 is arranged inside the chamber 208 and is driven by the impeller 1. An oil inlet and an oil outlet of the hydraulic pump 15 are connected to an oil inlet pipe 16 and an oil outlet pipe 17, respectively. The oil inlet pipe 16 and the oil outlet pipe 17 are extended out of a water surface. The oil inlet pipe 16 and the oil outlet pipe 17 are connected to the hydraulic motor 19. The hydraulic motor 19 drives the electric generator to generate electricity. The hydraulic pump and the hydraulic motor can be connected via hydraulic elements, such as hydraulic valves.

The hydraulic pump 15 is a rotary screw hydraulic pump comprising a pump casing 151, a main pump rotor 152, and an auxiliary pump rotor 153. The main pump rotor 152 and the auxiliary pump rotor 153 are engaged with each other.

The hydraulic pump 15 can also be a scroll hydraulic pump, a piston hydraulic pump, or other types of hydraulic pumps.

The electric generator is placed on the float; or the oil inlet pipe 16 and oil outlet pipe 17 are extended away from the device in the water, such as an offshore platform or the land, to actuate the hydraulic motor which further drives the electric generator to operate. Thus, the hydraulic oil from different hydraulic circuits can be accumulated to drive a large scale electric generator, or the accumulated hydraulic oil drives different hydraulic motors and corresponding electric generators via a plurality of oil pipes.

The invention claimed is:

1. A device for converting wave energy into electricity, comprising:
   a) a float (5);
   b) a guiding-accelerating wheel (2), the guiding-accelerating wheel (2) comprising a wheel body (201) comprising a casing (2010), a wheel center (2011), and a chamber (208);
   c) an impeller (1); and
   d) an electric generator (4), the electric generator (4) comprising a rotor (402);
   wherein
   the float (5) is upward and downward movable in accord with a movement of wave;
   the guiding-accelerating wheel (2) is connected to a lower part of the float (5);
   the wheel center (2011) is disposed inside the casing (2010); a plurality of deflectors (2012) is annularly arranged between the casing (2010) and the wheel body (201), and the deflectors (2012) are inclined to a same direction;
   water channels (202) are formed by the casing (2010), the wheel center (2011), and every two adjacent deflectors (2012), each water channel comprising a water outlet (2022);
   the impeller (1) is clamped on the guiding-accelerating wheel (2) at a position corresponding to the water outlet (2022) of the water channel (202), and the impeller (1) is movable in relation to the guiding-accelerating wheel (2);
   a plurality of blades (101) is annularly arranged on the impeller (1);
   the blades (101) cooperate with the water outlet (2022) to allow the water from the water outlet (2022) to collide with the blades (101) and drive the impeller (1) to rotate;
   the electric generator (4) is arranged inside the chamber (208);
   the rotor (402) is driven by the impeller (1);
   a plurality of vertical anti-rotating boards (205) is disposed on an outer side of the casing (2010); a vertical height of the vertical anti-rotating board (205) is larger than a thickness thereof;
   a plurality of anti-rotating ear-shaped plates (603) is disposed on an outer side of a downward pressurizing cylinder (6); and
   the vertical anti-rotating boards (205) are in rigid connection with the anti-rotating ear-shaped plates (603), respectively.

2. The device of claim 1, wherein
   the chamber (208) is arranged inside the wheel center (2011) close to the impeller (1);
   the electric generator further comprises a stator (401);
   the impeller (1) further comprises an impeller shaft (102);
   the stator (401) is in rigid connection with the wheel center (2011); and
   the rotor (402) is connected to and driven by the impeller shaft (102).

3. The device of claim 1, wherein at least one of the wheel center (2011) and the casing (2010) is in a shape of a cone for forming a tapered cross section of the water channel (202).

4. The device of claim 3, wherein
   the casing (2010) is in a shape of a cylinder;
   the wheel center (2011) is in a shape of a cone;
   the deflectors (2012) are disposed on a lower part of the casing (2010); and
   a top of the casing (2010) and the wheel center (2011) form a water inlet cavity (2015).

5. The device of claim 1, wherein
   the blades (101) are a curved blade comprising a concave side;
   the concave side of the blades (101) faces the water outlet (2022) for allowing the water from the water outlet (2022) to collide with the concave side of the blades (101).

6. The device of claim 1, wherein
   a downward pressurizing cylinder (6) is connected to the lower part of the float (5);
   the downward pressurizing cylinder (6) comprises a water storage cavity (601) comprising a top and a bottom;
   the top of the water storage cavity (601) is open; and
   a water leaking hole (602) is arranged on the bottom of the water cavity (602).

7. A device for converting wave energy into electricity, comprising:
   a) a float (5);
   b) a guiding-accelerating wheel (2), the guiding-accelerating wheel (2) comprising a wheel body (201) comprising a casing (2010), a wheel center (2011), and a chamber (208);
   c) an impeller (1); and
   d) an air compressor (8), the air compressor (8) comprising an air inlet and an air outlet;
   wherein
   the float (5) is upward and downward movable in accord with a movement of wave;
   the guiding-accelerating wheel (2) is connected to a lower part of the float (5);
   the wheel center (2011) is disposed inside the casing (2010); a plurality of deflectors (2012) is annularly arranged between the casing (2010) and the wheel body (201), and the deflectors (2012) are inclined to a same direction;
   water channels (202) are formed by the casing (2010), the wheel center (2011), and every two adjacent deflectors (2012), each water channel comprising a water outlet (2022);
   the impeller (1) is clamped on the guiding-accelerating wheel (2) at a position corresponding to the water outlet (2022) of the water channel (202), and the impeller (1) is movable in relation to the guiding-accelerating wheel (2);
   a plurality of blades (101) is annularly arranged on the impeller (1);
   the blades (101) cooperate with the water outlet (2022) to allow the water from the water outlet (2022) to collide with the blades (101) and drive the impeller (1) to rotate;
   the air compressor (8) is arranged inside the chamber (208) and is driven by the impeller (1);
   the air inlet and the air outlet of the air compressor (8) are connected to an air inlet pipe (9) and an air outlet pipe (10), respectively; the air inlet pipe (9) and the air outlet pipe (10) are extended out of a water surface;

the air outlet pipe (10) is connected to an air motor (11); and the air motor (11) drives an electric generator to generate electricity.

8. The device of claim 7, wherein the air compressor (8) is a rotary screw air compressor comprising a compressor casing (801), a main rotor (802), and an auxiliary rotor (803); and the main rotor (802) and the auxiliary rotor (803) are engaged with each other.

9. The device of claim 7, wherein a number of the guiding-accelerating wheel (2) is two; the two guiding-accelerating wheels (2) are arranged on a lower side and an upper side of the impeller (1), respectively; and the air compressor (8) is arranged inside each of the guiding-accelerating wheels (2).

10. A device for converting wave energy into electricity, comprising:
a) a float (5);
b) a guiding-accelerating wheel (2), the guiding-accelerating wheel (2) comprising a wheel body (201) comprising a casing (2010), a wheel center (2011), and a chamber (208);
c) an impeller (1); and
d) a hydraulic pump (15), the hydraulic pump (15) comprising an oil inlet and an oil outlet;
wherein
the float (5) is upward and downward movable in accord with a movement of wave;
the guiding-accelerating wheel (2) is connected to a lower part of the float (5);

the wheel center (2011) is disposed inside the casing (2010); a plurality of deflectors (2012) is annularly arranged between the casing (2010) and the wheel body (201), and the deflectors (2012) are inclined to a same direction;

water channels (202) are formed by the casing (2010), the wheel center (2011), and every two adjacent deflectors (2012), each water channel comprising a water outlet (2022);

the impeller (1) is clamped on the guiding-accelerating wheel (2) at a position corresponding to the water outlet (2022) of the water channel (202), and the impeller (1) is movable in relation to the guiding-accelerating wheel (2);

a plurality of blades (101) is annularly arranged on the impeller (1);

the blades (101) cooperate with the water outlet (2022) to allow the water from the water outlet (2022) to collide with the blades (101) and drive the impeller (1) to rotate;

the hydraulic pump (15) is arranged inside the chamber (208) and is driven by the impeller (1);

the oil inlet and the oil outlet of the hydraulic pump (15) are connected to an oil inlet pipe (16) and an oil outlet pipe (17), respectively; the oil inlet pipe (16) and the oil outlet pipe (17) are extended out of a water surface;

the oil inlet pipe (16) and the oil outlet pipe (17) are connected to hydraulic motor (19); and the hydraulic motor (19) drives an electric generator to generate electricity.

* * * * *